(12) United States Patent
Hama et al.

(10) Patent No.: US 6,636,340 B1
(45) Date of Patent: Oct. 21, 2003

(54) MULTI-BEAM SCANNING DEVICE

(75) Inventors: Yoshihiro Hama, Saitama-ken (JP); Yasushi Suzuki, Saitama-ken (JP); Taminori Odano, Saitama-ken (JP); Susumu Mikajiri, Chiba-ken (JP)

(73) Assignee: Pentax Corporation, Tokyo (JP)

( * ) Notice: Subject to any disclaimer, the term of this patent is extended or adjusted under 35 U.S.C. 154(b) by 71 days.

(21) Appl. No.: 09/619,692

(22) Filed: Jul. 19, 2000

(30) Foreign Application Priority Data

Jul. 21, 1999 (JP) .......................................... 11-206830

(51) Int. Cl.⁷ .............................................. G02B 26/08
(52) U.S. Cl. ........................ 359/204; 359/206; 347/233
(58) Field of Search ................................ 359/204, 205, 359/206, 216, 217, 218; 347/134, 137, 259, 233, 244

(56) References Cited

U.S. PATENT DOCUMENTS

| 5,181,137 A | 1/1993 | Koide |
| 5,243,359 A | * 9/1993 | Fisli ............................ 347/134 |
| 5,784,094 A | 7/1998 | Ota et al. |
| 5,801,746 A | * 9/1998 | Yamaguchi et al. ........ 347/259 |

FOREIGN PATENT DOCUMENTS

| JP | 2-58015 | 2/1990 |
| JP | 6-160743 | 6/1994 |
| JP | 9-5656 | 1/1997 |
| JP | 10133131 | 5/1998 |

* cited by examiner

*Primary Examiner*—Euncha Cherry
(74) *Attorney, Agent, or Firm*—Greenblum & Bernstein, P.L.C.

(57) ABSTRACT

A multi-beam scanning device is provided with a light source that emits a plurality of light beams, a polygonal mirror that deflects the light beams emitted by the light source to scan, and an optical system that converges the deflected light beams on a plurality of objects to be scanned. The optical system includes an optical path turning system that turns optical paths of the deflected light beams, respectively. The optical path turning system is constructed such that optical path lengths of the optical path of the deflected light beams are the same, and one of the optical paths directed to an object located farthest from the polygonal mirror consists of two linear paths and one turning portion at which a beam is deflected.

5 Claims, 7 Drawing Sheets

MULTI-BEAM SCANNING DEVICE

BACKGROUND OF THE INVENTION

The present invention relates to a multi-beam scanning device for scanning a plurality of beams respectively emitted by a plurality of light sources toward objects to be scanned.

A scanning device employed in a monochromatic laser printer or the like, which forms an image in accordance with an electrophotographic imaging method, is provided with a laser diode, which is driven in accordance with an image signal. A laser beam emitted by the laser diode is collimated by a collimating lens, deflected by a polygonal mirror within a predetermined angular range, for example, in a horizontal direction. The scanning beam is refracted and converged by an fθ lens, and incident on an object, for example, a photoconductive drum so that the surface of the photoconductive drum is exposed to light in accordance with the image signal, thereby a latent image being thereon.

The latent image is developed as toner is applied. The developed image, i.e., the toner image is transferred onto a recording sheet, and fixed thereon.

A color printer or a color copier, which forms a color image in accordance with the electrophotographic imaging method, is also known. Among various types of color printers or copiers, one employing a scanning device, which is provided with a plurality of light sources for respective color components, is known. Such a scanning device (which will be referred to as a multi-beam scanning device hereinafter) is provided with, for example, four light sources (laser diodes) for yellow, magenta, cyan and black components, and four fθ lenses for respective color components. Four photoconductive drums for the four color components are provided, and the laser beams emitted by the four laser diodes are incident on the four photoconductive drums through the four fθ lenses, respectively. The above-described exposing, developing and transferring procedure of the electrophotographic method are performed for each color component, the four toner images for the four colors are overlaid in the transferring process, and finally, the fixing process is performed for fixing the overlaid toner images of all the color components on a recording sheet.

In the multi-beam scanning device, it is necessary that the distance between the photoconductive drums is relatively long. Downsizing of electrophotographic processing units, such as discharging unit, charging unit, developing unit and transferring unit is limited, and it is preferable that a space surrounding the photoconductive drum is large. Further, it is also preferable that a toner container which supplies toner to the developing unit is large. If the toner container is large, the toner is to be refilled less frequently.

On the other hand, for an optical system including the fθ lenses, it is important that an optical path length from a polygonal mirror to each photoconductive drum should be made as short as possible. If the optical path length is longer, the fθ lens should be made larger, and therefore, the entire device should be made larger.

SUMMARY OF THE INVENTION

It is therefore an object of the present invention to provide an improved multi-beam scanning device, in which a distance between objects to be scanned can be made relatively wide, and an optical path length from the polygonal mirror to each object to be scanned can be minimized, and therefore, the entire device can be downsized.

For the above object, according to the present invention, there is provided a multi-beam scanning device, provided with a light source that emits a plurality of light beams, a polygonal mirror that deflects the light beams emitted by the light source to scan, and an optical system that converges the deflected light beams on a plurality of objects to be scanned. The optical system includes an optical path turning system that turns optical paths of the deflected light beams, respectively. The optical path turning system is constructed such that optical path lengths of the optical path of the deflected light beams being the same. In this configuration, one of the optical paths directed to an object located farthest from the polygonal mirror consists of two linear paths and one turning portion at which a beam is deflected.

With this construction, if the optical length of the optical path directing the beam to the farthest object is minimized, the other optical path can easily be adjusted to have the same optical length. Therefore, the distance between the polygonal mirror and each object can be reduced. Further, a sufficient distance between each object can be obtained.

Therefore, the scanning device can be downsized, and sufficient room for arranging the electrophotographic imaging process can be obtained.

Optionally, the optical system includes an fθ lens group including at least a first fθ lens, a second fθ lens and a plurality of third fθ lenses, the number of the third fθ lenses corresponding to the number of the objects, all the light beams deflected by the polygonal mirror passing the first and second fθ lenses, the plurality of light beams passed through the first and second fθ lenses passing respective one of the plurality of third fθ lenses.

In this case, the first fθ lens converges the light beams mainly in an auxiliary scanning direction that is perpendicular to a main scanning direction in which the plurality of light beams scan.

Optionally or alternatively, the second fθ lens converging the light beams only in a main scanning direction in which the plurality of light beams scan.

Further optionally or alternatively, each of the third fθ lenses converging an incident light beam in a main scanning direction where the light beams scan and in an auxiliary scanning direction perpendicular to the main scanning direction.

According to another aspect of the invention, there is provided a multi-beam scanning device, which is provided with a light source that emits a plurality of light beams, a polygonal mirror that deflects the light beams emitted by the light source to scan, and an optical system that converges the deflected light beams on a plurality of objects to be scanned. The optical system includes a plurality of fθ lenses and an optical path turning system that turns optical paths of the deflected light beams, respectively. The plurality of fθ lenses include a first fθ lens through which all of the light beams deflected by the polygonal mirror pass. The optical path turning system is constructed such that optical path lengths of the optical path of the deflected light beams being the same. The plurality of objects being arranged on one side of the polygonal mirror, the plurality of objects being located at different distances from the polygonal mirror, respectively. One of the plurality of optical paths directed to an object located closest to the polygonal mirror includes a portion located between the polygonal mirror and the first fθ lens.

With this construction, a distance between the polygonal mirror and an object closest to the polygonal mirror can be made relatively short, and the objects can be spaced from each other sufficiently. Accordingly, the scanning device can be downsized, and sufficient room for arranging the units necessary for the electrophotographic imaging process can be obtained.

Optionally, the fθ lenses includes at least a first fθ lens, a second fθ lens and a plurality of third fθ lenses. All the light beams deflected by the polygonal mirror pass the first and second fθ lenses, and the plurality of light beams passed through the first and second fθ lenses pass respective one of the plurality of third fθ lenses.

In this case, the first fθ lens may converge the light beams mainly in an auxiliary scanning direction that is perpendicular to a main scanning direction in which the plurality of light beams scan.

Optionally or alternatively, the second fθ lens may converge the light beams only in a main scanning direction in which the plurality of light beams scan.

Optionally or alternatively, each of the third fθ lenses may converge an incident light beam in a main scanning direction where the light beams scan and in an auxiliary scanning direction perpendicular to the main scanning direction.

According to a further aspect of the invention, there is provided a multi-beam scanning device, which is provided with a light source that emits more than two light beams, a polygonal mirror that deflects the light beams emitted by the light source to scan, and an optical system that converges the deflected light beams on more than two objects to be scanned, the number of objects corresponding to the number of light beams emitted by the light source. The optical system includes an optical path turning system that turns optical paths of the deflected light beams, respectively, the optical path turning system being constructed such that optical path lengths of the optical path of the deflected light beams being the same. Further, one of the optical paths includes a portion located on one side of the polygonal mirror, the other of the optical paths located on the opposite side of the polygonal mirror.

With this configuration, one of the objects can be located on one side of the polygonal mirror, and the other objects can be located on the opposite side of the polygonal mirror. Therefore, the distance between the polygonal mirror and each of the objects can be made shorter, and the objects can be arranged to be spaced from each other sufficiently. Accordingly, the scanning device can be downsized, and sufficient room for arranging the units for the electrophotographic imaging process can be obtained.

Optionally, the optical system includes an fθ lens group having a plurality of fθ lenses, the fθ lens group including a first fθ lens, all the laser beams deflected by the polygonal mirror passing through the first fθ lens. All the optical paths located on the opposite side of the polygonal mirror being directed to respective objects, the objects arranged on the one side of the polygonal mirror being located at different distances from the polygonal mirror, respectively. One of the optical paths located on the opposite side of the polygonal mirror directed to one of the objects located closest to the polygonal mirror includes a portion located between the polygonal mirror and the first fθ lens.

In this case, the fθ lenses may include at least a first fθ lens, a second fθ lens and a plurality of third fθ lenses. All the light beams deflected by the polygonal mirror pass the first and second fθ lenses, and the plurality of light beams passed through the first and second fθ lenses pass respective one of the plurality of third fθ lenses.

Further, the first fθ lens may converge the light beams mainly in an auxiliary scanning direction that is perpendicular to a main scanning direction in which the plurality of light beams scan.

Optionally or alternatively, the second fθ lens may converge the light beams only in a main scanning direction in which the plurality of light beams scan.

Optionally or alternatively, each of the third fθ lenses may converge an incident light beam in a main scanning direction where the light beams scan and in an auxiliary scanning direction perpendicular to the main scanning direction.

Further, the first fθ lens may converge the light beams mainly in an auxiliary scanning direction that is perpendicular to a main scanning direction in which the plurality of light beams scan.

Furthermore, the optical system may include an fθ lens group including at least a first fθ lens, a second fθ lens and a plurality of third fθ lenses, the number of the third fθ lenses corresponding to the number of the objects, all the light beams deflected by the polygonal mirror passing the first and second fθ lenses, the plurality of light beams passed through the first and second fθ lenses passing respective one of the plurality of third fθ lenses.

In this case, the first fθ lens may converge the light beams mainly in an auxiliary scanning direction that is perpendicular to a main scanning direction in which the plurality of light beams scan.

Optionally or alternatively, the second fθ lens may converge the light beams only in a main scanning direction in which the plurality of light beams scan.

Optionally or alternatively, each of the third fθ lenses may converge an incident light beam in a main scanning direction where the light beams scan and in an auxiliary scanning direction perpendicular to the main scanning direction.

BRIEF DESCRIPTION OF THE ACCOMPANYING DRAWINGS

FIG. 1 schematically shows a plan view of a multi-beam scanning device according to a first embodiment of the invention;

DETAILED DESCRIPTION OF THE EMBODIMENT

Hereinafter, multi-beam scanning devices according to embodiments of the present invention will be described with reference to the accompanying drawings. In each embodiment, the multi-beam scanning device is described as a device employed in a color printer.

First Embodiment

Figure 1:
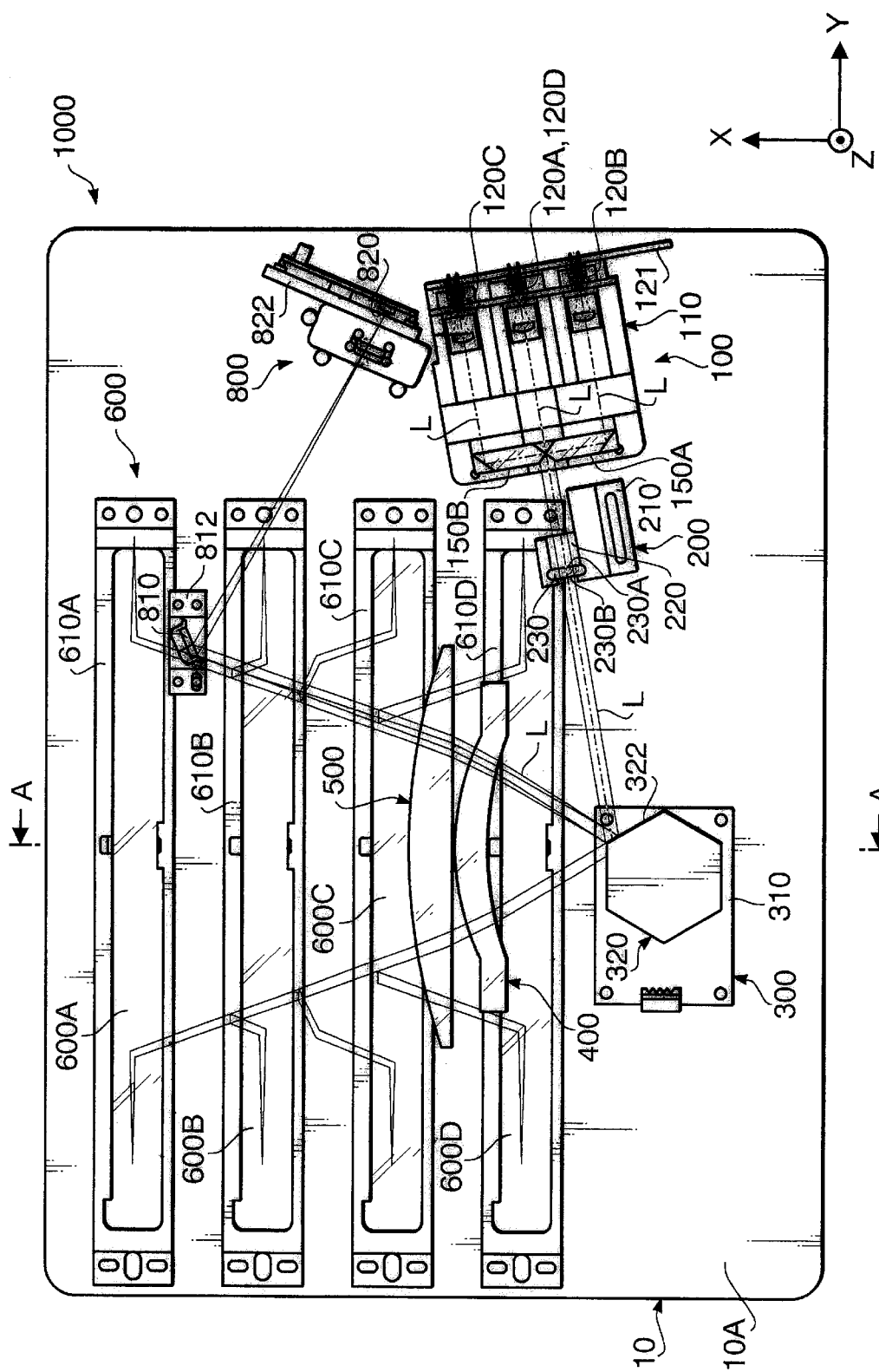
Figure 2:
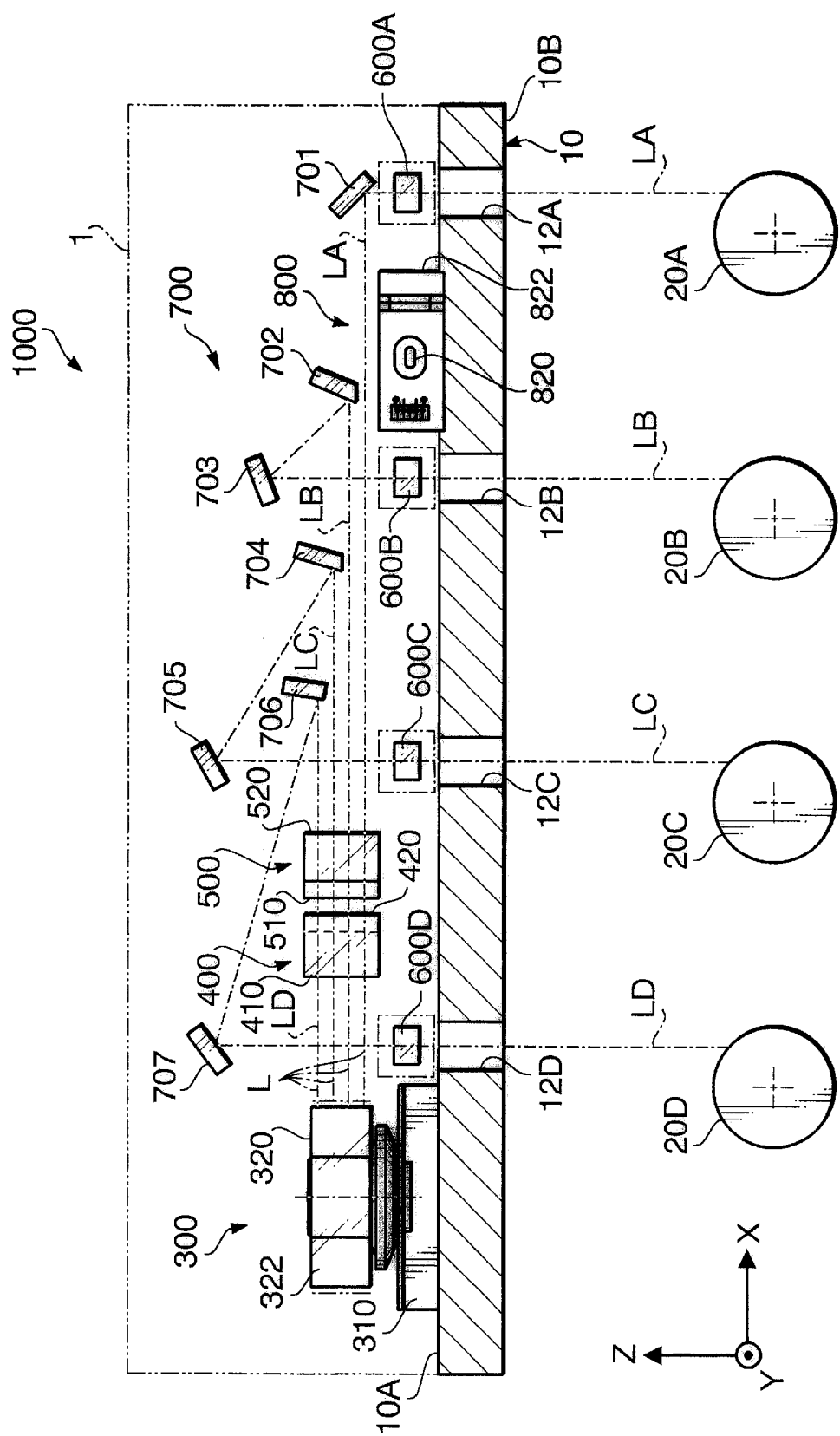
FIG. 2 is a cross sectional side view taken along line A—A in FIG. 1.

FIG. 1 schematically shows a structure of a multi-beam scanning device 1000 according to a first embodiment of the invention. FIG. 2 is a cross sectional side view of the multi-beam scanning device 1000 taken along line A—A in FIG. 1.

In the drawings, for clarifying directions referred to, an XYZ coordinate system is introduced. An X-Y plane extends horizontally when the multi-beam scanning device 1000 is in use, and a Z-axis direction is a vertical direction.

The multi-beam scanning device 1000 includes a housing 1 (see FIG. 2) having a bottom plate 10. On an upper surface 10A of the bottom plate 10, a light source unit 100, a cylindrical lens unit 200, a polygonal mirror unit 300, a first fθ lens 400, a second fθ lens 500, third fθ lenses 600A–600D, an optical path turning system 700 (which is shown only in FIG. 2), a horizontal synchronizing signal detecting unit 800, and the like are provided.

As shown in FIG. 2, the bottom plate 10 extends in the horizontal direction (a direction parallel with the X-Y plane). Below a lower surface 10B of the bottom plate 10, four photoconductive drums 20A, 20B, 20C and 20D are provided spaced apart from the lower surface 10B, such that the four photoconductive drums 20A, 20B, 20C and 20D are spaced from each other in the horizontal direction (i.e., in the X-axis direction). The photoconductive drums 20A, 20B, 20C and 20D are rotatably supported about respective rotational axes thereof, which are arranged in parallel and spaced apart with each other. The photoconductive drums 20A, 20B, 20C and 20D are arranged, in the X-axis direction, on one side, along the X-axis direction, of the polygonal mirror 300, in the order of 20D, 20C, 20B and 20A. It should be noted that optical paths of the beams deflected by the polygonal mirror 300 are located, when viewed along the Z-axis, on the same side of the polygonal mirror unit 300, where the photoconductive drums 20A, 20B, 20C and 20D are arranged.

The photoconductive drum 20D, which is closer to the polygonal mirror 300 than the other photoconductive drums, is located, when viewed along the Z-axis, between the first fθ lens 400 and the polygonal mirror unit 300. The third fθ lens 600D, which is closer to the polygonal mirror unit 300 than the other fθ lenses, is located, when viewed in the Z-axis direction, between the polygonal mirror unit 300 and the first fθ lens 400.

The four photoconductive drums 20A, 20B, 20C and 20D are provided for different color components, yellow, magenta, cyan and black componets, respectively. That is, from the photoconductive drums 20A, 20B, 20C and 20D, yellow, magenta, cyan and black toner images are transferred onto a recording sheet, respectively.

Operation of the multi-beam scanning device 1000 will be described.

Four laser beams L are emitted from the light source unit 100. The four laser beams L pass through the cylindrical lens 230 of the cylinder lens unit 200, and are deflected by the polygonal mirror unit 300 to scan.

The scanning beams L are converged on the photoconductive drums 20A, 20B, 20C and 20D, respectively, via the first fθ lens 400, the second fθ lens 500, the optical path turning system 700 and the third fθ lenses 600.

Each of the scanning beams L deflected by the polygonal mirror unit 300 is directed to the horizontal signal detecting unit 800. Based on the detection by the horizontal signal detecting unit 800, a drawing starting timing in the main scanning direction is synchronized in accordance with the output signal of the horizontal signal detecting unit 800.

It should be noted that the main scanning direction of each beam L is parallel with the axial direction of the photoconductive drums 20A, 20B, 20C and 20D. A direction perpendicular to the main scanning direction will be referred to as an auxiliary scanning direction.

Next, each unit will be described in detail.

The light source unit 100 includes:

four laser diodes 120A, 120B, 120C and 120D, which emit the laser beams having the same wavelength;

four collimating lenses for collimating the laser beams L emitted by the laser diodes 120A–120D, respectively; and an a laser diode driving circuit for driving the laser diodes 120A–120D.

The light source unit 100 is constructed such that the laser beams L emerged from the collimating lenses 230 are on the same plane that is perpendicular to an X-Y plane, and spaced from each other in the Z-axis direction by a predetermined distance.

The cylindrical lens unit 200 includes:

a base 210 secured on the upper surface 10A of the wall 10;

a lens holding unit 220 standing on the base 210; and the cylindrical lenses 230 held by the lens holding unit 220.

Each of the cylindrical lenses 230 has a light receiving surface 230A on which one of the laser beams L emitted from the light source unit 100 is incident, and a light emerging surface 230B from which the laser beam L emerges.

Each of the cylindrical lenses 230 is configured such that the laser beam L is not converged in the horizontal direction (i.e., in a direction parallel to the X-Y plane), and is converged only in the vertical direction (i.e., in the Z-axis direction). The light beams L emerged from the cylindrical lenses 230 proceed to the polygonal mirror unit 300.

The focal point of the cylindrical lens 230 is substantially on a reflection surface, on which the laser beams L are incident, of the polygonal mirror 320. Thus, on the reflection surface, line-shaped images extending in the horizontal direction are formed by the four laser beams L.

The polygonal mirror unit 300 includes a motor unit 310 secured on the upper surface 10A of the bottom plate 10, and the polygonal mirror 320 secured on a rotational shaft 312 extending in the vertical direction (i.e., the Z-axis direction).

The polygonal mirror 320 is an equilateral hexagon when viewed from the top. Each side of the hexagon (i.e., each side surface of the polygonal mirror 320) is formed as a single flat reflection surface 322, which are perpendicular to the horizontal plane (i.e., the X-Y plane). The laser beams L are incident on each reflection surface 322 as the polygonal mirror 320 rotates.

In FIG. 1, the motor unit 310 is driven to rotate the polygonal mirror 320 counterclockwise at a high and constant speed in accordance with a drive signal transmitted from a motor control circuit (not shown). As the polygonal mirror 320 rotates, each beam L is deflected to scan in a direction from a left-hand side to a right-hand side of the drawing.

The first fθ lens 400, together with a second and a third fθ lenses 500 and 600, constitutes an fθ lens group. The scanning laser beams L deflected by the polygonal mirror 320 pass through the fθ lens group and are converged on the photoconductive drums 20A–20D.

All the laser beams L deflected by the polygonal mirror 320 are incident on the first fθ lens 400. The fθ lens 400 is mounted on the upper surface 10A of the bottom plate 10 by means of a holding member. The first fθ lens 400 is composed as a single element formed of a single material.

The first fθ lens 400 has a first surface 410 on which the laser beams L are incident, and a second surface 420 from which the laser beams L emerge (see FIG. 2).

Four optical paths of the laser beams L intersect with the second surface 420 of the first fθ lens 400. The four optical paths are spaced from each other in the vertical direction (i.e., the Z-axis direction) by a predetermined amount.

The first fθ lens 400 functions mainly to converge the incident beams L in the vertical direction, and also function to slightly converge the incident beams L in the horizontal direction (i.e., in the Y-axis direction). It should be noted that the power of the first fθ lens 400 to converge the beams L in the horizontal direction is weaker than the power to converge the beams L in the vertical direction.

The second fθ lens 500 has a first surface 510 on which the laser beams L emerged from the first fθ lens 400 are incident, and a second surface 520 from which the laser beams L emerge. The second fθ lens 500 is mounted on the upper surface 10A of the bottom plate 10 by means of a holding member (not shown).

The second fθ lens 500 is a single element formed of single material, and all the laser beams L pass through the second fθ lens 500.

The second fθ lens 500 converges the incident beams L only in the horizontal direction (i.e., in the Y-axis direction), and does not converge the beams L in the vertical direction (i.e., in the Z-axis direction).

The optical path turning system 700 is configured to direct the laser beams L emerged from the second fθ lens 500 to the third fθ lenses 600A–600D, respectively. The optical path turning system 700 includes first to seventh mirrors 701–707 for reflecting incident beams.

The first mirror 701 is arranged such that the lowermost beam of the beams L emerged from the second surface 520 of the second fθ lens 500, along the vertical direction (i.e., the Z-axis direction), is reflected by the first mirror 701 and is directed to the photoconductive drum 20A located at the farthest position from the polygonal mirror 320. The optical path of the lowermost beam from the polygonal mirror 320 to the photoconductive drum 20A is defined as an optical path LA.

The second and third mirrors 702 and 703 are arranged such that the second lowest beam along the vertical direction is reflected and directed to the photoconductive drum 20B located at second farthest position from the polygonal mirror 320. The optical path of the second lowest beam from the polygonal mirror 320 to the photoconductive drum 20B is defined as an optical path LB.

The fourth and fifth mirrors 704 and 705 are arranged such that the third lowest beam along the vertical direction is reflected and directed to the photoconductive drum 20C located at third farthest position from the polygonal mirror 320. The optical path of the third lowest beam from the polygonal mirror 320 to the photoconductive drum 20B is defined as an optical path LC.

The sixth and seventh mirrors 706 and 707 are arranged such that the uppermost beam along the vertical direction is reflected and directed to the photoconductive drum 20D located at the closest position, among the four photoconductive drums 20A–20D, to the polygonal mirror 300. The optical path of the uppermost beam from the polygonal mirror 320 to the photoconductive drum 20D is defined as an optical path LD.

As shown in FIG. 2, the optical paths LA–LD of the four leaser beams between the polygonal mirror 320 and the optical path turning system 700 are parallel to each other, and spaced from each other, in the vertical direction, by a predetermined amount. Further, between the polygonal mirror 320 and the optical path turning system 700, the path LC is located directly above the path LD, the path LB is directly above the path LC, and the path LA is directly above the path LB.

Each of the first through seventh mirrors 701–707 extends in the Y-axis direction so as to reflect the scanning beams L. The first through seventh mirrors 701–707 are fixed on the upper surface 10A of the bottom plate 10 at positions shown in FIGS. 1 and 2 by means of not shown securing members.

Each of the third fθ lenses 600A–600D has a power to converge an incident beam mainly in the auxiliary scanning direction (i.e., the X-axis direction). The third fθ lenses 600A–600D also have power in the main scanning direction (i.e., the Y-axis direction). Each of the third fθ lenses 600A–600D is configured such that the power in the auxiliary scanning direction is greater than the power in the main scanning direction.

On the bottom plate 10, at positions directly above the photoconductive drums 20A–20D, openings 12A–12D, which are through-openings in the direction of the thickness of the bottom plate 10, are formed. Each of the openings 12A–12D extends in the Y-axis direction, i.e., in parallel with the rotational axes of the photoconductive drums 20A–20D so as to allow the scanning beams L proceeding along the optical paths LA–LD to pass therethrough.

At end portions, along the Y-axis direction, of the openings 12A–12D, holding members 610A–610D are provided, as shown in FIG. 1, for holding the third fθ lenses 600A–600D, respectively.

As shown in FIGS. 1 and 2, the third fθ lenses 600A–600D respectively receive the four scanning beams L. Each of the third fθ lenses 600A–600D has a first surface on which the scanning beam is incident, and a second surface from which the beam is emerged.

The optical path turning system 700 including the first through seventh mirrors 701–707 will be described in detail hereinafter.

The optical path LA includes:

a first linear path defined between the second surface 520 of the second fθ lens 500 and the first mirror 701;

a turning position where the path is turned to be directed toward the photoconductive drum 20A; and a second linear path defined between the first mirror 701 and the photoconductive drum 20A.

As above, the path LA includes two linear paths, and a single turning portion.

The optical path LB includes:

a first linear path defined between the second surface 520 of the second fθ lens 500 and the second mirror 702;

a first turning portion where the path is turned by the third mirror 703 to be directed toward the third mirror 703;

a second linear path defined between the second and third mirror 702 and 703;

a second turning portion where the path is turned to be directed toward the photoconductive drum 20B; and a third linear path defined between the third mirror 703 and the photoconductive drum 20B.

As above, the path LB includes three linear paths and two turning portions.

The optical path LC includes:

a first linear path defined between the second surface 520 of the second fθ lens 500 and the fourth mirror 704;

a first turning portion where the path is turned by the fourth mirror 704 to be directed toward the third mirror 705;

a second linear path defined between the fourth and fifth mirror 704 and 705;

a second turning portion where the path is turned by the fifth mirror 705 to be directed toward the photoconductive drum 20C; and the third linear path defined between the fifth mirror 705 and the photoconductive drum 20C.

As above, the path LC includes three linear paths and two turning portions.

The optical path LD includes:

a first linear path defined between the second surface 520 of the second fθ lens 500 and the sixth mirror 706;

a first turning portion where the path is turned by the sixth mirror 706 to be directed toward the seventh mirror 707;

a second linear path defined between the sixth and seventh mirror 706 and 707;

a second turning portion where the path is turned by the seventh mirror 707 to be directed toward the photoconductive drum 20D; and a third linear path defined between the seventh mirror 707 and the photoconductive drum 20D.

As above, the path LD includes three linear paths and two turning portions.

The third liner path of the path LD includes a portion located above the space between the polygonal mirror unit 300 and the first fθ lens 400.

As afore-mentioned, the first and second fθ lenses 400 and 600 mainly converge the laser beams L in the auxiliary scanning direction, and the second fθ lens 500 mainly converges the laser beams L in the main scanning direction.

The linear images formed substantially on the reflection surface 322 of the polygonal mirror 320 are reflected thereby, and are further converged as passed through the first through third fθ lenses 400, 500 and 600, and beam spots are formed on the photoconductive drums 20A–20D, respectively.

It should be noted that the optical paths LA–LD have the same length.

The horizontal synchronizing signal detection unit 800 includes a mirror 810 and a photo sensor 820. The mirror 810 is secured on the upper surface 10A of the bottom plate 10 by a securing member 812 as shown in FIG. 1. The photo sensor 820 is secured on the upper surface 10A of the bottom plate 10 by a securing member 822.

The mirror 810 is arranged at a position within a scanning range of a beam but out of a range contributing to image formation. The mirror 810 is arranged to reflect the incident beam to the photo sensor 820.

By controlling driving signals for the laser diodes 120A through 120D synchronously with the detection signal output by the photo sensor 820, timing for starting image formation on the photoconductive drums 20A–20D can be synchronized.

According to the multi-beam scanning device 1000 constructed as above, the laser beams L emitted by the light source unit 100 and pass through the cylindrical lenses 230 are deflected to scan by the reflection surfaces 322 of the polygonal mirror 320, and directed to the first fθ lens 400.

The laser beams L pass through the first and second fθ lenses 400 and 500, and are directed to the photoconductive drums 20A–20D along the paths LA–LD, respectively. Thus, the scanning beam spots are formed on the photoconductive drums 20A–20D, respectively.

In the above-described first embodiment, the optical path LA directing the laser beam to the photoconductive drum 20A, which is located at the farthest position from the polygonal mirror 320, includes two linear paths and one turning portion.

If the multi-beam scanning device 1000 is configured such that the path LA is minimized (i.e., the path LA has a minimum length within a required range), since the second paths of the paths LB, LC and LD can be adjusted easily to have the same length as that of the path LA, all the paths LA–LD can be configured to have the minimum length.

Further, the third path of the optical path LD has a portion located between the polygonal mirror 320 and the first fθ lens 400. Accordingly, a distance between the polygonal mirror 320 and the photoconductive drum 20D as well as a distance between the polygonal mirror 320 and the third fθ lens 600D along the X-axis direction can be reduced easily.

Therefore, it is possible to make the length of the optical paths LA–LD the same with remaining necessary space between the photoconductive drums 20A–20D. That is, according to the first embodiment, even if the length of the paths LA–LD is minimized, sufficient room can be provided for arranging the discharging unit, charging unit, developing unit and transferring unit for performing the electrophotographic process. Further, since there is sufficient space for providing the above units, a space for providing a toner container can also be obtained. Thus, the capacity of toner of the scanning device can be increased.

Furthermore, since the distance between the polygonal mirror and the photoconductive drums can be reduced, the scanning device can be downsized in comparison with conventional devices.

Second Embodiment

Figure 3:
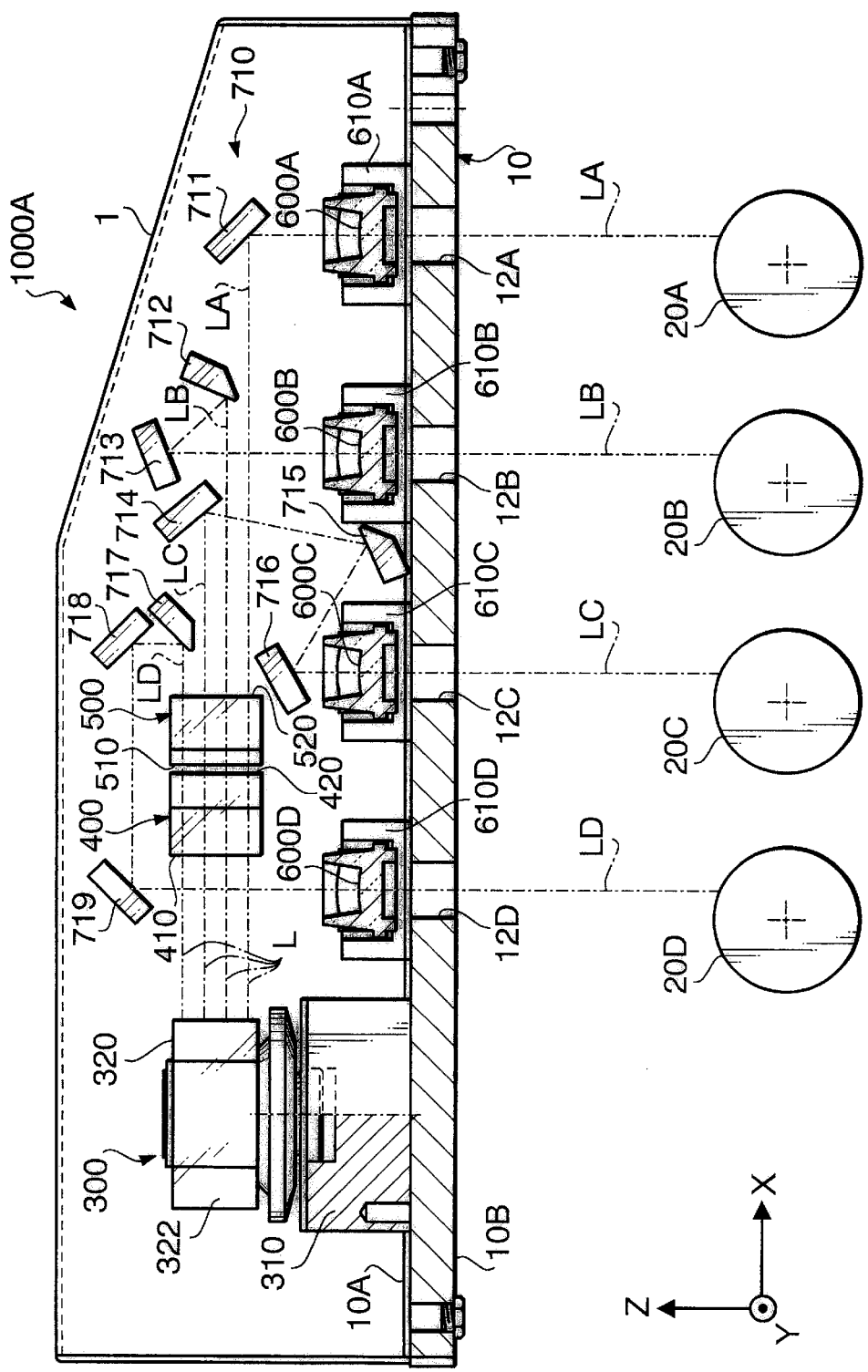
FIG. 3 is a cross sectional side view of a multi-beam scanning device according to a second embodiment of the invention.

FIG. 3 shows a cross sectional side view of a multi-beam scanning device 1000A according to a second embodiment of the invention.

In FIG. 3, the same reference numerals are assigned to elements similar to those employed in the first embodiments, and description thereof will be omitted.

The multi-beam scanning device 1000A includes an optical path turning system 710 instead of the optical path turning element 700 employed in the first embodiment.

The optical path turning system 710 includes first through ninth mirrors 711–719.

The first mirror 711 reflects the lowermost beam emitted by the light source unit 100. The lowermost beam reflected by the first mirror 711 is directed to the photoconductive drum 20A located at the farthest position from the polygonal mirror unit 300. The optical path of the lowermost beam from the polygonal mirror 320 to the photoconductive drum 20A is defined as an optical path LA.

The second and third mirrors 712 and 713 reflect the second lowermost beam of the beams L emitted by the light source unit 100. The beam reflected by the second and third mirrors 712 and 713 is directed to the photoconductive drum 20B. The optical path of the second lowermost beam from the polygonal mirror 320 to the photoconductive drum 20B is defined as an optical path LB.

As above, the first through third mirrors 711–713 are arranged similarly to the first through third mirrors 701–703 of the first embodiment.

The fourth through sixth mirrors 714–716 are arranged to direct the third lowermost beam to the photoconductive drum 20C. The optical path of the third lowermost beam from the polygonal mirror 320 to the photoconductive drum 20C is defined as an optical path LC.

The seventh through ninth mirrors 717–719 are arranged to direct the upper most beam of the beams L emitted by the light source unit 100 to the photoconductive drum 20D. The optical path of the uppermost beam from the polygonal mirror 320 to the photoconductive drum 20D is defined as an optical path LD.

Each of the first through ninth mirrors 711–719 extends in a direction parallel to the main scanning direction (i.e., in the Y-axis direction), and secured onto the upper surface 10A of the bottom plate 10 by means of not shown securing members.

The optical path LA includes:

a first linear path defined between the second surface 520 of the second fθ lens 500 and the first mirror 711;

a turning position where the path is reflected by the first mirror 711 and turned to direct toward the photoconductive drum 20A; and a second linear path defined between the first mirror 711 and the photoconductive drum 20A.

As above, the path LA includes two linear paths, and a single turning portion.

The optical path LB includes:

a first linear path defined between the second surface 520 of the second fθ lens 500 and the second mirror 712;

a first turning portion where the path is bent by the second mirror 712 to be directed toward the third mirror 713;

a second linear path defined between the second and third mirrors 712 and 713;

a second turning portion where the path is turned to be directed toward the photoconductive drum 20B; and a third linear path defined between the third mirror 713 and the photoconductive drum 20B.

As above, the path LB includes three linear paths and two turning portions.

The optical path LC includes:

a first linear path defined between the second surface 520 of the second fθ lens 500 and the fourth mirror 714;

a first turning portion where the path is turned downward by the fourth mirror 714 to be directed toward the third mirror 715;

a second linear path defined between the fourth and fifth mirror 714 and 715;

a second turning portion where the path is turned upward by the fifth mirror 715 to be directed toward the sixth mirror 716;

a third linear path defined between the fifth mirror 715 and the six mirror 716;

a third turning portion where the optical path is turned downward by the sixth mirror 716; and a fourth linear path defined between the sixth mirror 716 and the photoconductive drum 20C.

As above, the path LC includes four linear paths and three turning portions.

The optical path LD includes:

a first linear path defined between the second surface 520 of the second fθ lens 500 and the seventh mirror 717;

a first turning portion where the path is turned upward by the seventh mirror 717 to be directed toward the eighth mirror 718;

a second linear path defined between the seventh and eighth mirrors 717 and 718;

a second turning portion where the path is turned by the eighth mirror 718 to be directed horizontally toward the ninth mirror 719;

a third linear path defined between the eighth mirror 718 and the ninth mirror 719;

a third turning portion where the path is turned downward by the ninth mirror 719; and a fourth linear path along which the beam reflected by the ninth mirror 719 proceeds to the photoconductive drum 20D via the third fθ lens 600D.

As above, the path LD includes four linear paths and three turning portions.

The third linear path of the path LD includes a portion that extends horizontally, and is located above the first and second fθ lenses 400 and 500.

The fourth linear path of the path LD also includes a portion located between the polygonal mirror unit 300 and the first fθ lens 400.

The second embodiment is different from the first embodiment by the structure of the optical path turning system, and both embodiments are functionally the same, substantially, and have the same advantages with respect to the conventional devices.

Third Embodiment

Figure 4:
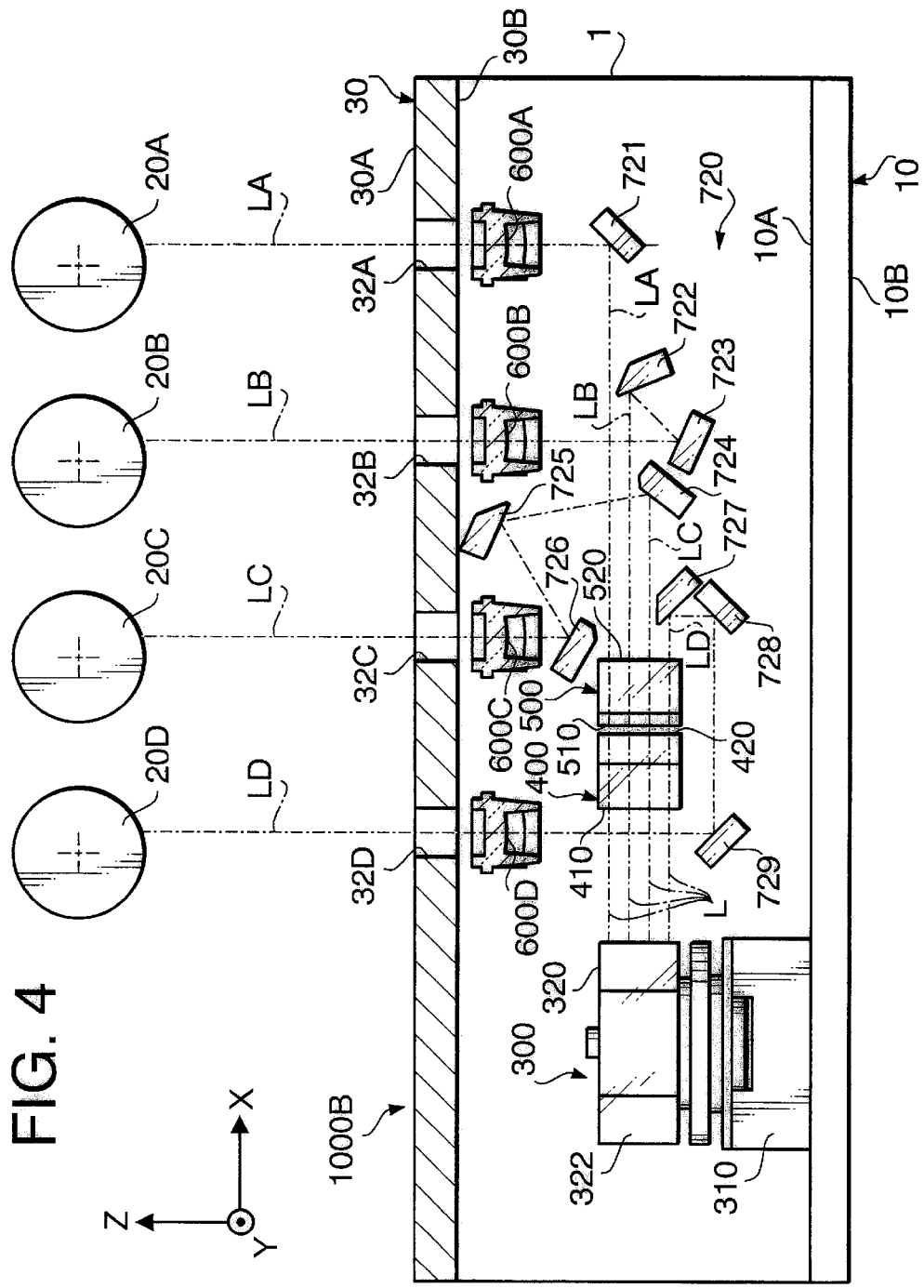
FIG. 4 is a cross sectional side view of a multi-beam scanning device according to a third embodiment of the invention.

FIG. 4 is a cross sectional side view of the multi-beam scanning device 1000B according to a third embodiment of the present invention.

In FIG. 4, the same reference numerals are assigned to the members which are the same as those used in the first and/or second embodiments, and description thereof will be omitted.

The scanning device 1000B has a structure which is "up-side-down" of the structure of the scanning device 1000A according to the second embodiment. Specifically, in the scanning device 1000B according to the third embodiment, the photoconductive drums 20A–20D are located above the scanning device 1000B, and the third fθ lenses 600A–600D are secured on the lower surface of the upper plate 30.

As shown in FIG. 4, the upper plate 30 extends horizontally (i.e., parallel to an X-Y plane) at the upper portion of the housing 1. Above the upper surface 30A of the upper plate 30, the photoconductive drums 20A–20D are rotatably provided. The rotational axes of the photoconductive drums 20A–20D are parallel with the upper surface 30A, extend in the Y-axis direction, and spaced from each other by a predetermined amount in the X-axis direction.

On the top plate 30, at positions directly below the photoconductive drums 20A–20D, openings 32A–32D, which are through-openings in the direction of the thickness of the top plate 30, are formed. Each of the openings 32A–32D extends in the Y-axis direction, i.e., in parallel with the rotational axes of the photoconductive drums 20A–20D so that the scanning beams L proceeding along the optical paths LA–LD pass through the openings 32A–32D.

At end portions, along the Y-axis direction, of the openings 32A–32D, holding members (not shown) are provided for holding the third fθ lenses 600A–600D, respectively.

The scanning device 1000B employs an optical path turning system 720, which includes first to ninth mirrors 721–729.

The first mirror 721 reflects the uppermost beam of the beams L emitted by the light source unit 100. The reflected uppermost beam is directed to the photoconductive drum 20A located at the farthest position from the polygonal mirror unit 300. The optical path of the uppermost beam from the polygonal mirror 320 to the photoconductive drum 20A is defined as an optical path LA.

The second and third mirrors 722 and 723 reflect the second upper beam, which is directed to the photoconductive drum 20B. The optical path of the second uppermost beam from the polygonal mirror 320 to the photoconductive drum 20B is defined as an optical path LB.

The fourth through sixth mirrors 724–726 are arranged to direct the third uppermost beam to the photoconductive drum 20C. The optical path of the third uppermost beam from the polygonal mirror 320 to the photoconductive drum 20C is defined as an optical path LC.

The seventh through ninth mirrors 727–729 are arranged to direct the lowermost beam to the photoconductive drum 20D. The optical path of the lowermost beam from the polygonal mirror 320 to the photoconductive drum 20D is defined as an optical path LD.

Each of the first through ninth mirrors 721–729 extends in a direction parallel to the main scanning direction (i.e., in the Y-axis direction), and secured onto the lower surface 30A of the top plate 30 by means of not shown securing members.

Since the optical paths LA–LD of the scanning devic4e 1000B and those in the scanning device 1000A according to the second embodiment are substantially symmetrical, detailed description thereof will be omitted.

It should be noted, however, that the third linear path defined as a path between the eighth and ninth mirrors 728 and 729 of the path LD includes a portion that extends horizontally (i.e., in parallel with the X-Y plane), and is located below the first and second fθ lenses 400 and 500.

Further, the fourth linear path of the optical path LD includes a portion located between the polygonal mirror unit 300 and the first fθ lens 400.

The structure of the optical path turning system 720 of the third embodiment is functionally similar to that of the second embodiment, and therefore, both embodiments have the same advantages in comparison to the conventional devices.

Fourth Embodiment

Figure 5:
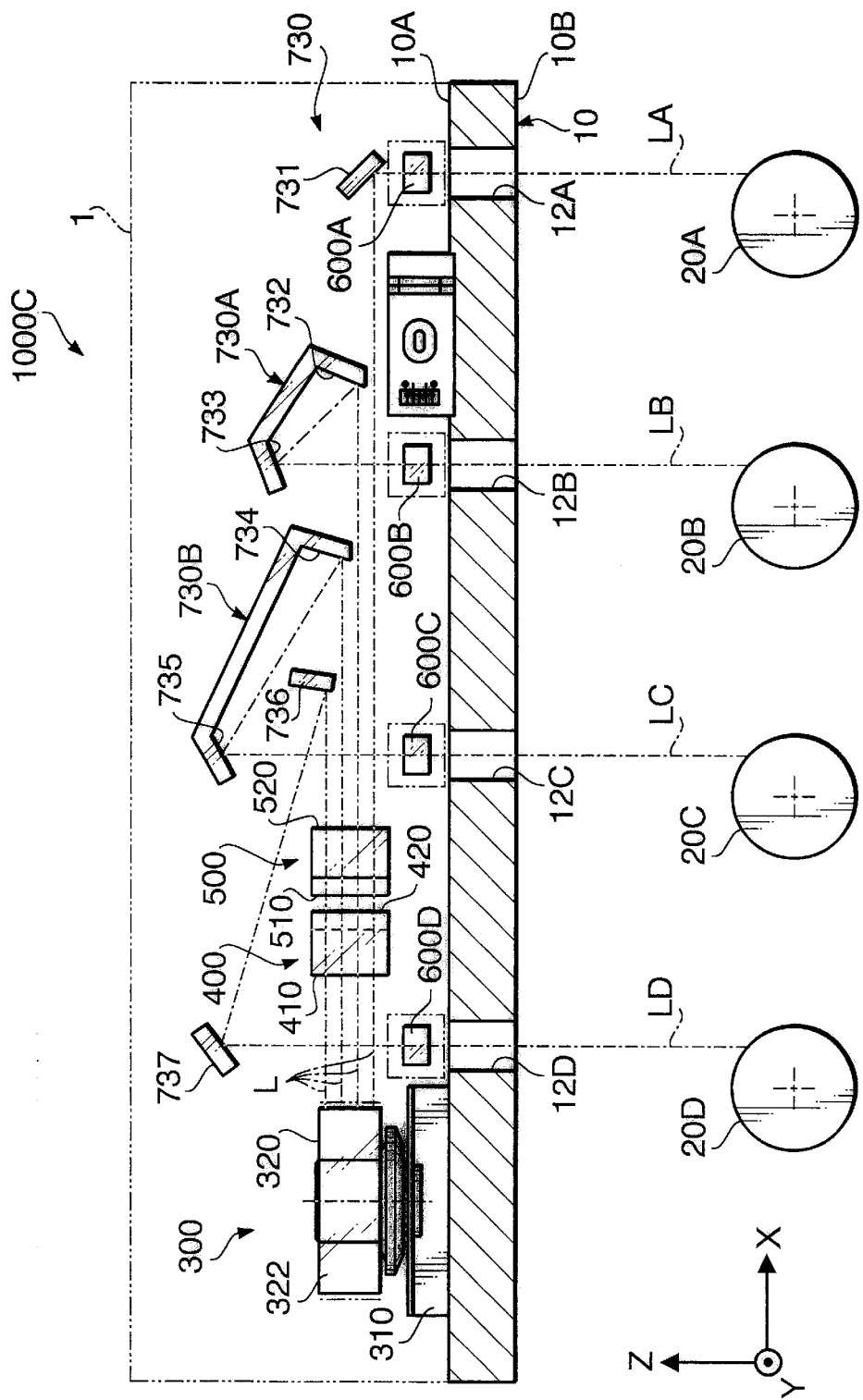
FIG. 5 is a cross sectional side view of a multi-beam scanning device according to a fourth embodiment of the invention.

FIG. 5 is a cross sectional side view of a multi-beam scanning device 1000C according to a fourth embodiment of the invention.

In FIG. 5, the same reference numerals are assigned to the members used in the first embodiment, and description thereof will be omitted.

The scanning device 1000C according to the fourth embodiment is different from the scanning device 1000 shown in FIG. 1 mainly by the structure of the optical path turning elements.

The optical path turning system 730 includes a first mirror 731, a first mirror unit 730A, a second mirror unit 730B, and a third mirror unit 730C. The first mirror unit 730A includes integrally formed second and third mirrors 732 and 733. The second mirror unit 730B includes integrally formed fourth and fifth mirrors 734 and 735. The third mirror unit 730C includes integrally formed sixth and seventh mirrors 736 and 737.

It should be noted that the arrangement of the first through seventh mirrors 731–737 in the fourth embodiment is similar to the arrangement of the first through seventh mirrors 701–707 in the first embodiment. Functions of the first through seventh mirrors 731–737 are the same as those in the first embodiment, and the description thereof will be omitted.

Since a plurality of mirrors are integrally formed to be a mirror unit, the number of elements is reduced.

The fourth embodiment also provides advantages similar to those in the first embodiment.

Fifth Embodiment

Figure 6:
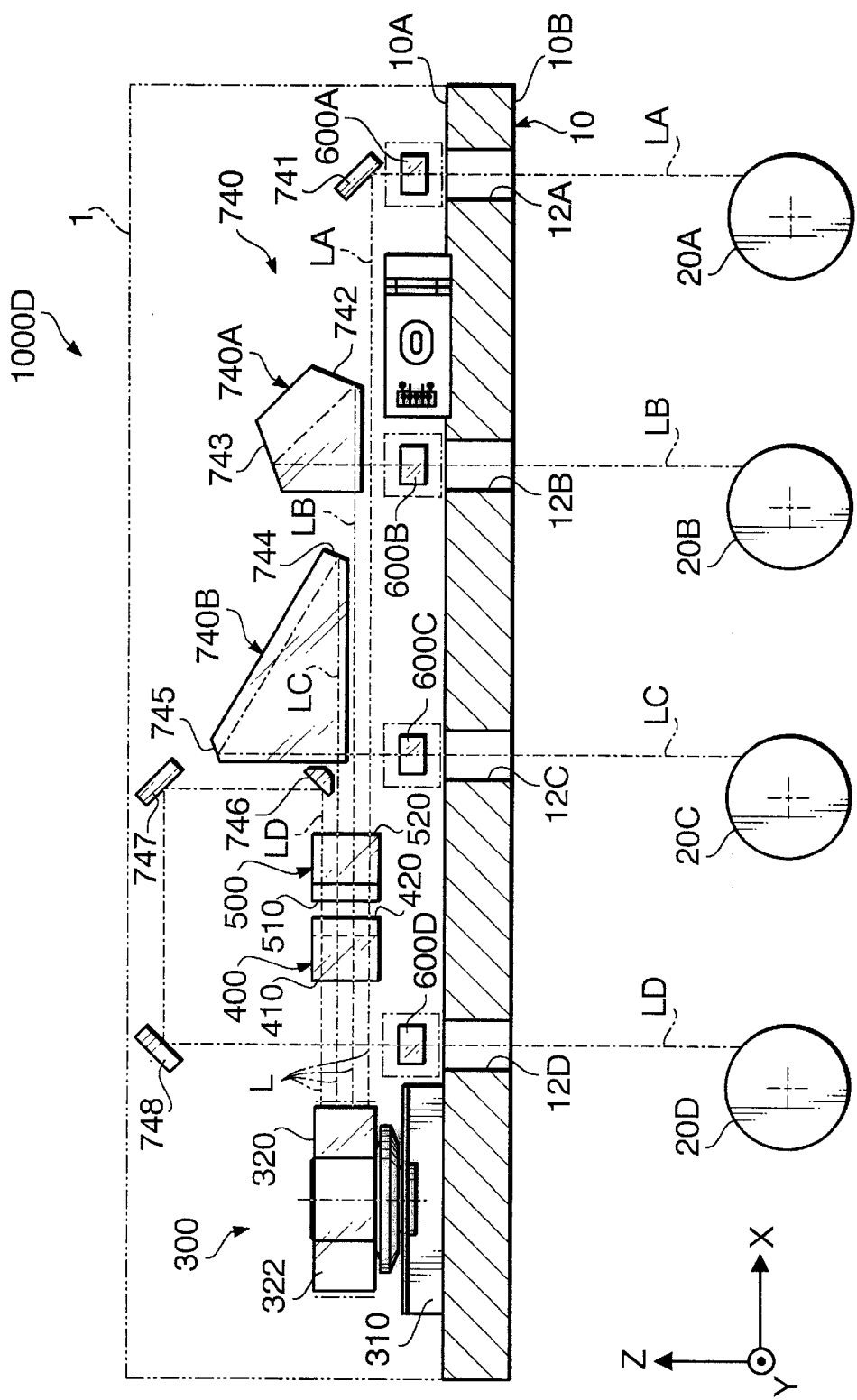
FIG. 6 is a cross sectional side view of a multi-beam scanning device according to a fifth embodiment of the invention.

FIG. 6 is a cross sectional side view of a multi-beam scanning device 1000D according to a fifth embodiment of the invention.

In FIG. 6, to the elements similar to those employed in the first embodiment, the same reference numerals are assigned, and description thereof will be omitted.

The fifth embodiment is different from the first embodiment only by the structure of the optical path turning system 740.

The scanning device 1000D is provided with an optical path turning system 740, which includes a first mirror 741, a first prism 740A formed with a second mirror 742 and a third mirror 743, a second prism 740B formed with a fourth mirror 744 and a fifth mirror 745, a sixth mirror 746, a seventh mirror 747 and an eighth mirror 748.

In the fifth embodiment, by providing the first and second prisms 740A and 740B, each including a plurality of mirrors, the number of elements can be reduced.

The first mirror 741 reflects the lowermost beam emitted by the light source unit 100. The beam reflected by the first mirror 741 is directed to the photoconductive drum 20A located at the farthest position from the polygonal mirror unit 300. The optical path of the lowermost beam from the polygonal mirror 320 to the photoconductive drum 20A is defined as an optical path LA.

The second and third mirrors 742 and 743 reflect the second lowest beam, which is directed to the photoconductive drum 20B. The optical path of the second lowermost beam from the polygonal mirror 320 to the photoconductive drum 20B is defined as an optical path LB.

The fourth and fifth mirrors 744 and 745 are arranged to direct the third lowest beam to the photoconductive drum 20C. The optical path of the third lowermost beam from the polygonal mirror 320 to the photoconductive drum 20C is defined as an optical path LC.

The sixth through eighth mirrors 746–748 are arranged to direct the uppermost beam to the photoconductive drum 20D. The optical path of the uppermost beam from the polygonal mirror 320 to the photoconductive drum 20D is defined as an optical path LD.

Each of the first through eighth mirrors 741–748 extends in a direction parallel to the main scanning direction (i.e., the Y-axis direction). The first mirror 741 and the sixth through eighth mirrors 746–748, and the first and second prisms 740A and 740B are secured onto the upper surface 10A of the bottom plate 10 by means of not shown securing members.

The optical path turning system 740 will be described in detail hereinafter.

The optical path LA includes:

a first linear path defined between the second surface 520 of the second fθ lens 500 and the first mirror 711;

a turning position where the path is turned to be directed toward the photoconductive drum 20A; and a second linear path defined between the first mirror 741 and the photoconductive drum 20A.

As above, the path LA includes two linear paths, and a single turning portion.

The optical path LB includes:

a first linear path defined between the second surface 520 of the second fθ lens 500 and the second mirror 742;

a first turning portion where the path is turned by the second mirror 742 to be directed toward the third mirror 743;

a second linear path defined between the second and third mirrors 742 and 743;

a second turning portion where the path is turned to be directed toward the photoconductive drum 20B; and a third linear path defined between the third mirror 743 and the photoconductive drum 20B.

As above, the path LB includes three linear paths and two turning portions.

The optical path LC includes:

a first linear path defined between the second surface 520 of the second fθ lens 500 and the fourth mirror 744;

a first turning portion where the path is turned downward by the fourth mirror 744 to be directed toward the third mirror 745;

a second linear path defined between the fourth and fifth mirrors 744 and 745;

a second turning portion where the path is turned upward by the fifth mirror 745 to be directed toward the photoconductive drum 20C; and a third linear path defined between the fifth mirror 745 and the photoconductive drum 20C.

As above, the path LC includes three linear paths and two turning portions.

The optical path LD includes:

a first linear path defined between the second surface 520 of the second fθ lens 500 and the sixth mirror 746;

a first turning portion where the path is turned upward by the sixth mirror 746 to be directed toward the seventh mirror 747;

a second linear path defined between the sixth and seventh mirrors 746 and 747;

a second turning portion where the path is turned by the seventh mirror 747 to be directed horizontally toward the eighth mirror 748;

a third linear path defined between the seventh mirror 747 and the eighth mirror 748;

a third turning portion where the path is turned downward by the eighth mirror 748; and a fourth linear path along which the beam reflected by the eighth mirror 748 proceeds to the photoconductive drum 20D via the third fθ lens 600D.

As above, the path LD includes four linear paths and three turning portions.

The third linear path of the path LD includes a portion that extends horizontally, and is located above the first and second fθ lenses 400 and 500.

The fourth linear path of the path LD includes a portion located between the polygonal mirror unit 300 and the first fθ lens 400.

According the fifth embodiment described above, the advantages similar to those of the first embodiment can be obtained.

Sixth Embodiment

Figure 7:
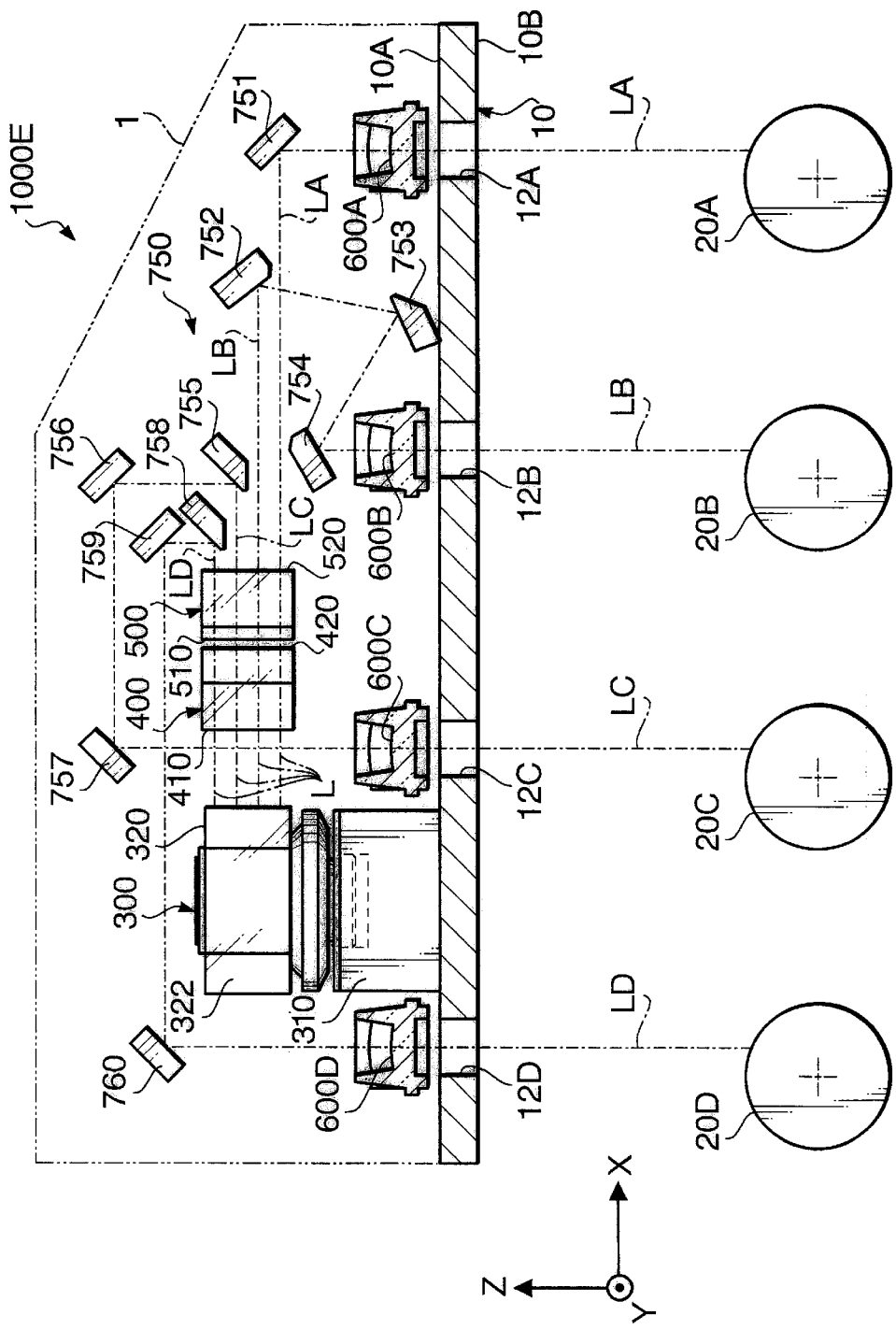
FIG. 7 is a cross sectional side view of a multi-beam scanning device according to a sixth embodiment of the invention.

FIG. 7 is a cross sectional side view of a multi-beam scanning device 1000E according to a sixth embodiment of the present invention.

In FIG. 7, the elements that are similar to those employed in the first embodiment are assigned with the same reference numerals, and description thereof will be omitted.

The main difference between the fist and sixth embodiments is the arrangement of the optical path turning system, the photoconductive drums and the third fθ lenses.

As shown in FIG. 7, one fθ lens 600D of third fθ lenses 600A–600D is located on one side, along the X-axis direction, of the polygonal mirror unit 300, and the other three fθ lenses 600A–600C are arranged on the other side of the polygonal mirror unit 300.

Corresponding to the arrangement of the third fθ lenses 600A–600D, one drum 20D of the photoconductive drums 20A–20D is located on one side, along the X-axis direction, of the polygonal mirror unit 300, and the other three photoconductive drums 600A–600C are located on the other side of the polygonal mirror unit 300.

The laser beams L reflected by the polygonal mirror 320 proceed from the left-hand side to the right-hand side in FIG. 7, and the fθ lens 600D and the photoconductive drum 20D are located, along the X-axis direction, on the left-hand side of the polygonal mirror unit 300. It should be noted that no beams are directed to the left-hand side of the polygonal mirror unit 300.

The scanning device 1000E employs optical path turning system 750, which includes first through tenth mirrors 751–760.

The first mirror 751 reflects the lowermost one of the beams emitted by the light source L toward the photoconductive drum 20A, which is located at the farthest position from the polygonal mirror 320. The path of the lowermost beam is defined as optical path LA.

The second through fourth mirrors 752–754 are arranged to direct the second lowermost beam emitted by the light source unit 100 to the photoconductive drum 20B, which is located at the second farthest position from the polygonal mirror 320. The path of the second lowermost beam is defined as optical path LB.

The fifth through seventh mirrors 755–757 are arranged to direct the third lowermost beam to the photoconductive drum 20C, which is located at the closest position with respect to the polygonal mirror 320. The path of the third lowermost beam is defined as optical path LC.

The eighth through tenth mirrors 758–760 are arranged to direct the uppermost beam emitted by the light source unit 100 to the photoconductive drum 20A, which is located on the left-hand side, along the X-axis direction in FIG. 7, of the polygonal mirror 320.

Each of the first through tenth mirrors 751–760 extends in the Y-axis direction (i.e., in the main scanning direction), and is secured onto the upper surface 10A of the bottom plate 10 by means of securing members (not shown).

The optical path turning elements 750 will be described in detail hereinafter.

As aforementioned, the optical path LA is configured to have a single mirror (i.e., the first mirror) 751.

The optical path LA includes:

a first linear path defined between the light emerging surface 520A of the second fθ lens 500 and the first mirror 751;

a first turning portion at which the light beams incident on the first mirror 751 is deflected downward toward the photoconductive drum 20A; and a second linear path defined between the first mirror 751 and the photoconductive drum 20A via the third fθ lens 600A.

As above, the optical path LA includes two linear paths and a single turning portion.

The optical path LB includes:

a first linear path defined between the light emerging surface 520A of the second fθ lens 500 and the second mirror 752;

a first turning portion at which the beam incident on the second mirror 752 is deflected obliquely downward toward the third mirror 753;

a second linear path defined between the second and third mirrors 752 and 753;

a second turning portion at which the beam incident on the third mirror 753 is deflected obliquely upward toward the fourth mirror 754;

a third linear path defined between the third and fourth mirrors 753 and 754; and a third turning portion at which the beam incident on the fourth mirror 754 is deflected downward toward the photoconductive drum 20B via the third fθ lens 600B.

As above, the optical path LB includes four linear paths and three turning portions.

The optical path LC includes:

a first linear path defined between the light emerging surface 520A of the second fθ lens 500 and the fifth mirror 755;

a first turning portion at which the beam incident on the fifth mirror 755 is deflected upward toward the sixth mirror 756;

a second linear path defined between the fifth and sixth mirrors 755 and 756;

a second turning portion at which the beam incident on the sixth mirror 756 is turned horizontally toward the seventh mirror 757;

a third linear path defined between the sixth and seventh mirrors 756 and 757; and a third turning portion at which the path is turned downward by the seventh mirror 757 and is directed toward the photoconductive drum 20A via the third fθ lens 600C.

As above, the optical path LC includes four linear paths and three turning portions.

The optical path LD includes:

a first linear path defined between the light emerging surface 520A of the second fθ lens 500 and the eighth mirror 758;

a first deflecting portion at which the path is turned upward toward the ninth mirror 759;

a second linear path defined between the eighth and ninth mirrors 758 and 759;

a second turning portion at which the path is turned horizontally toward the tenth mirror 760;

a third linear path defined between the ninth and tenth mirrors 759 and 760;

a third turning portion at which the path is turned downward by the tenth mirror 760 and is directed toward the photoconductive drum 20D via the third fθ lens 600D; and a fourth linear path defined between the tenth mirror 760 and the photoconductive drum 20D.

As above, the optical path LD includes four linear paths and three turning portions.

The third linear path of the path LC includes a portion that extends horizontally, and is located above the first and second fθ lenses 400 and 500.

The fourth linear path of the path LC includes a portion located between the polygonal mirror unit 300 and the first fθ lens 400.

With the above-described structure, the distance between the polygonal mirror 320 and each photoconductive drum can be made relatively small, and therefore the scanning device 1000E can be downsized.

Further, the third path of the optical path LD includes a portion extending horizontally, and located above the first and second fθ lenses 400 and 500, and the polygonal mirror unit 300.

Since the third path of the optical path LD, which directs a beam to the photoconductive drum 20D closest to the polygonal mirror 320, includes a portion extending horizontally (i.e., in the X-axis direction) and located above the polygonal mirror 320 and the first fθ lens 400, it becomes possible to reduce the distances, along the X-axis direction, between the polygonal mirror 320 and the photoconductive drum 20D, and between the polygonal mirror 320 and the third fθ lens 600D. Thus, the distance from the polygonal mirror 320 to the photoconductive drum 20D can be reduced. Therefore, the same advantages as in the first embodiment can also be obtained.

It should be noted that, in the above-described embodiments, four laser diodes 120A–120D are provided in the light source unit 100, and four laser beams corresponding to four colors (yellow, magenta, cyan, and black) are emitted therefrom. Then, using the first and second fθ lenses 400 and 500, the four beams L are converged in a direction corresponding to the auxiliary scanning direction on the photoconductive drums 20A–20D. The present invention, however, is not limited to this configuration using four beams.

For example, the device can be modified to use three beams corresponding to, for example, yellow, magenta and cyan.

As described above, each of the embodiments of the invention is provided with the scanning device is provided with a plurality of light source (e.g., laser diodes), a polygonal mirror, and an optical system directing the beams deflected by the polygonal mirror to respective objects (e.g., photoconductive drums) to be scanned. The optical system includes an optical path turning elements which turns each optical path such that all the optical paths have the same optical length regardless of the position of the objects to be scanned. In particular, the optical path directing a beam to the object located at the farthest position from the polygonal mirror is configured to have two linear paths and a single turning portion at which the beam is deflected.

With this construction, if the optical length of the optical path directing the beam to the farthest object is minimized, the other optical path can easily be adjusted to have the same optical length. Therefore, the distance between the polygonal mirror and each object can be reduced. Further, a sufficient distance between each object can be obtained.

Therefore, the scanning device can be downsized, and sufficient room for arranging the electrophotographic imaging process can be obtained.

The present disclosure relates to the subject matter contained in Japanese Patent Application No. HEI 11-206830, filed on Jul. 21, 1999, which is expressly incorporated herein by reference in its entirety.

What is claimed is:

1. A multi-beam scanning device, comprising:

a light source that emits a plurality of light beams;

a polygonal mirror that deflects the light beams emitted by said light source to scan; and an optical system that converges the deflected light beams on a plurality of objects to be scanned, said optical system including a plurality of fθ lenses and an optical path turning system that turns optical paths of the deflected light beams, respectively, said plurality of fθ lenses including at least a first fθ lens, a second fθ lens and a plurality of third fθ lenses, all the light beams deflected by said polygonal mirror passing through said first and second fθ lenses, each of the plurality of light beams passing through said first and second fθ lenses passing through a respective one of said plurality of third fθ lenses;

said optical path turning system being configured such that optical path lengths of the optical paths of the deflected light beams are the same, said plurality of objects being arranged on one side of said polygonal mirror, said plurality of objects located at different distances from said polygonal mirror, respectively, one of said plurality of optical paths directed to an object located closest to said polygonal mirror includes a portion passing between said polygonal mirror and said first fθ lens.

2. The scanning device according to claim 1, wherein said first fθ lens converges the light beams mainly in an auxiliary scanning direction that is perpendicular to a main scanning direction in which the plurality of light beams scan.

3. The scanning device according to claim 1, wherein said second fθ lens converges the light beams only in a main scanning direction in which the plurality of light beams scan.

4. The scanning device according to claim 1, wherein each of said third fθ lenses converges an incident light beam in a main scanning direction in which the light beams scan and in an auxiliary scanning direction perpendicular to the main scanning direction.

5. The scanning device according to claim 1, wherein more than half of the optical paths are configured such that the reflected beam is firstly directed in a direction away from an object prior to being directed towards the object.

* * * * *